US006861617B2

(12) United States Patent
Dull et al.

(10) Patent No.: US 6,861,617 B2
(45) Date of Patent: Mar. 1, 2005

(54) METHOD OF REDUCING DISTORTION BY TRANSIENT THERMAL TENSIONING

(75) Inventors: Randal Martin Dull, Columbus, OH (US); James R. Dydo, Groveport, OH (US); James Joseph Russell, Hilliard, OH (US); Janak Shanghvi, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 0 days.

(21) Appl. No.: 10/453,732

(22) Filed: Jun. 3, 2003

(65) Prior Publication Data

US 2004/0245231 A1 Dec. 9, 2004

(51) Int. Cl.[7] ................................................. B23K 9/00
(52) U.S. Cl. ................................. 219/137 R; 228/230
(58) Field of Search ............................. 219/137 R, 136; 228/230, 231

(56) References Cited

U.S. PATENT DOCUMENTS 3,182,179 A * 5/1965 Anderson, Sr. ......... 219/137 R
3,199,174 A * 8/1965 Nilsson et al. ............... 228/231
3,535,768 A * 10/1970 Pruitt et al. ............. 219/137 R

FOREIGN PATENT DOCUMENTS

JP      04-52079 A   *  2/1992
JP      04-220176 A  *  8/1992
WO      WO88/06505   *  7/1988

OTHER PUBLICATIONS

Guan, et al. "Low stress non–distortion welding" Welding in the World 33:3,pp 160–167.
Burak, et al. "Controlling the Longitudinal Plastic Shrinkage" Avt. Svarka, 1977, 3:27–29.
Michaleris, et al "Minimization of Welding Residual Stress" Welding Res. Supp., 11/99, pp. 361–366.
Michaleris and Sun, "Finite Element Analysis" Wel;ding Research Supp. 11/97, pp. 451–457.

* cited by examiner

Primary Examiner—Clifford C. Shaw
(74) Attorney, Agent, or Firm—Gallagher & Dawsey Co. L.P.; Michael J. Gallagher; David J. Dawsey

(57) ABSTRACT

A method to minimize the distortion, such as buckling, caused in the welding of thin plate by utilizing transient thermal tensioning to induce areas of residual tensile stress. Distortion of such welded plates after stiffeners are welded to the plates is due to large areas of unsupported residual compressive stress following the tensile stress that is induced along the weld lines by the welding of the stiffeners. Application of transient thermal tensioning by moving heat sources at the time of welding of the stiffeners induces areas of residual tensile stress that minimize the tendency of the plates to buckle. Multiple heat sources of variable intensity may be utilized, and multiple stiffeners may be welded to a single panel by the method. Minimization of distortion improves the function and appearance of the finished plates and minimizes post-welding repairs.

22 Claims, 9 Drawing Sheets

(STRESS PROFILE)

(STRESS PROFILE)

METHOD OF REDUCING DISTORTION BY TRANSIENT THERMAL TENSIONING

STATEMENT REGARDING FEDERALLY SPONSORED RESEARCH OR DEVELOPMENT

This invention was made with government support under Contract No. N00140-96-C-0188, Navy Joining Center Project No. 42372GDE awarded by the Office of Naval Research (ONR). The government has certain rights in the invention.

TECHNICAL FIELD

The present invention relates to the field of material joining; particularly, to a method of transient thermal tensioning of panels during welding to reduce distortion.

BACKGROUND OF THE INVENTION

Numerous industries have long sought to reduce, or eliminate, distortion of panels that have been joined by welding. Weld induced distortion has plagued many industries, including the automobile, aviation, heavy manufacturing, and shipbuilding industries, among others, since the advent of welding.

Such distortion has become an increasingly common problem as manufacturers increase the use of relatively thin plates of material to construct various articles of manufacture in an effort to reduce weight. The thin plates generally must be reinforced with stiffeners welded to the plates to obtain the strength required for a particular application. This stiffener welding introduces residual stresses in the structure and may lead to several modes of distortion, namely, transverse shrinkage, angular change, rotational distortion, longitudinal shrinkage, longitudinal bending, and buckling distortion. Hereinafter usage of the term distortion shall refer to all types of distortion generally, unless indicated otherwise. Thin plates are particularly susceptible to buckling distortion due to their low bending stiffness compared to their membrane stiffness. Buckling distortion is characterized by a wavy undulating surface of the plate. Such out-of-plane distortion is often many orders of magnitude greater than the thickness of the plate and generally leads to the loss of dimensional control and structural integrity.

During welding, a weld region's high temperature causes compressive stress as a result of thermal expansion in the region and the corresponding restraint on the expansion by the surrounding cooler material. The compressive stress in the weld region may then exceed the yield stress of the plate at the elevated temperature. As such, material in the vicinity of the weld plastifies and compressive plastic strains are produced. As the weld cools the stress patterns change from compressive to tensile in the locations that have plastified during the welding, thereby producing residual tensile stress in the weld region.

Buckling distortion occurs if the residual compressive stress in the plate exceeds the critical buckling stress of the assembly. Therefore, stated another way, buckling distortion is a result of the creation of residual tensile stress in the plate along each stiffener and the residual compressive stress in the plate between each stiffener and along any free edge of the plate.

Industry has tried to overcome buckling distortion in a number of ways, both mechanically and thermally. Some industries, including shipbuilding, have simply learned to accept buckling distortion and apply a post-welding procedure to remedy the distortion. The post-welding procedure is often referred to as "flame straightening" and involves the heating of discrete spots of the plate until they are red hot and then quenching the spots with water to reduce the wavy nature of the stiffened plates. Shipyards generally employ an entirely separate class of skilled tradespeople known as flame straighteners to perform this function. Such flame straightening is a trial and error approach that requires tremendous skill and is extremely time consuming. Flame straightening often requires the repainting of flame damaged areas. In fact, studies have indicated that $3.4 million is spent correcting distortion during the construction of each destroyer built for the United States Navy.

Some have tried to overcome buckling distortion using mechanical methods. An example of this has been called "low stress non-distortion (LSND) welding" as reported by Guan, et al., in their paper "Low stress non-distortion (LSND) welding—a new technique for thin materials;" *Welding in the World*, 33:3, pp. 160–167 (1994). These methods are often referred to as "back bending" and generally include some form of mechanical tensioning. In the method of Guan, et al., a stretching effect is produced by specific temperature distribution while restraining fixtures (e.g., "two-point:clamping") are used to prevent transient out-of-plane buckling movement of the workpieces. As one with skill in the an can imagine, mechanical tensioning of large plates is impractical for most applications.

The most promising method for overcoming buckling distortion of thin plates is known as thermal tensioning. Thermal tensioning is characterized by the application of auxiliary heat during the welding process. Thermal tensioning is divided into static thermal tensioning and transient, or dynamic, thermal tensioning. Static thermal tensioning is a technique for controlling welding residual stress and distortion by generating tensile stress at the weld zone prior to, and during welding, by imposing a predetermined steady state temperature gradient. Achieving a predetermined steady state temperature gradient requires the use of a combination of heating elements and cooling elements to create a heat sink and achieve the temperature gradient. Heating elements, often in the form of direct fired heaters or resistive heating blankets, are applied on opposing sides of the stiffener location at a predetermined distance away from the stiffener. Cooling is then provided in the immediate vicinity of the proposed weld location and is generally accomplished with the impingement of cool water to the underside of the plate. An exemplar of this technique is seen in the work of Burak, et al, reported in "Controlling the Longitudinal Plastic Shrinkage of Metal During Welding;" *Avt. Svarka*, No. 3, pp. 27–29 (1977).

Burak, et al., utilized electrical strip heating elements beneath the plate and lateral to the weld line, with a water cooled copper plate below the weld line, to produce the required gradient. Welding the stiffener to the plate takes place once the desired temperature differential is achieved. While carefully controlled small scale laboratory experimentation have shown that static thermal tensioning does reduce the amount of buckling distortion, it is widely accepted that the use of steady state heating and cooling would not be practical in a manufacturing environment due to the time required to reach steady state and the limitations associated with cooling elements.

Transient thermal tensioning utilizes a transient temperature differential generally produced by two heating bands traveling along with the welding torches that are joining the stiffener to the plate. A large amount of research has been performed on the transient thermal tensioning technique, as applied to the reduction of residual stress. This research has primarily focused on determining the appropriate intensity, size, and location of the heat source to minimize welding residual stress, thereby reducing the amount of distortion. More specifically, and most importantly, the research has been directed to reducing the maximum value of the peak stress, i.e. the maximum tensile stress, observed at the stiffeners. A detailed analysis of thermal tensioning to minimize tensile stress is seen in Michaleris and Sun, "Finite Element Analysis of Thermal Tensioning Techniques Mitigating Weld Buckling Distortion;" *Welding Research Supplement*, November 1997, pp. 451-s thorough 457-s; and Michaleris, et al., "Minimization of Welding Residual Stress and Distortion in Large Structures;" *Welding Research Supplement*, November 1999, pp. 361-s through 366-s. This focus on reducing the maximum value of the peak stress has not provided the results necessary to make transient thermal tensioning commercially viable.

In contrast, the method of the present invention makes no attempt to reduce the peak stress, but rather focuses on altering the stress pattern. By inducing areas of tensile stress in desirable locations, the present invention achieves the primary goal, that of greatly reducing the propensity of the plate to buckle.

Accordingly, the art has needed a means for minimizing distortion that occurs concurrently with the welding of the stiffeners. While some of the prior art devices attempted to improve the state of the art, none have recognized the importance of achieving a desirable stress pattern to reducing the propensity to buckle. Additionally, the prior art has not been suitable for widespread application in a manufacturing environment. The prior art has failed to achieve the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations. An object of the invention is to minimize buckling resulting from the welding of stiffeners to relatively thin plates by utilizing transient thermal tensioning to create areas of tensile stress in the welded plate that interrupt areas of compressive stress. The instant invention demonstrates such capabilities and overcomes many of the shortcomings of prior methods in new and novel ways. While disclosed primarily in the welding of stiffeners to plate, the transient thermal tensioning of the instant invention may be used in many other welding applications, such as, by way of example and not limitation, the butt welding of sheets.

In one of the many preferable configurations, the method comprises a method of transient thermal tensioning that creates areas of tensile stress that interrupt areas of residual compressive stress at desirable locations, and thereby reduce the tendency of welded plate to buckle. The method comprises, in general, the steps of applying transient thermal tensioning to reduce buckling distortion involved by applying a carefully controlled amount of heat in a specific pattern at a specific distance from a weld, and moving the area of heat along with the welding torch as the weld is made. The distance of the heat from the weld varies with the characteristics of the weldments.

These variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

Figure 1:
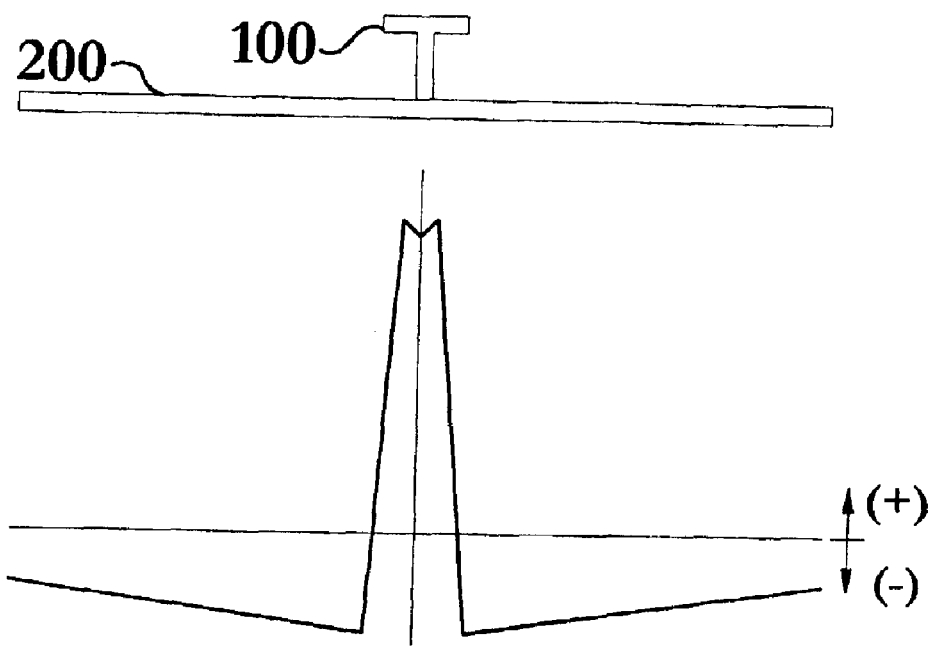
FIG. 1 shows, in transverse section, a residual stress profile of an experimental plate with a single welded longitudinal stiffener.

The method of transient thermal tensioning of the present invention enables a significant advance in the state of the art. The preferred embodiments of the method accomplish this by new and novel arrangements of elements and methods that are configured in unique and novel ways and which demonstrate previously unavailable but preferred and desirable capabilities. In particular, the method is a low-cost, easily reproducible technique that is attractive in the manufacturing environment because it is simple to apply, requires virtually no equipment modification, and is environmentally friendly. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

In order to reduce weight, many industries are increasingly favoring the use of stiffened thin plates to construct various assemblies. The plates are stiffened by welding stiffeners on to them. The welding procedure introduces residual stresses in the structure. This leads to several modes of distortion, namely transverse shrinkage, angular change, rotational distortion, longitudinal shrinkage, longitudinal bending, and buckling distortion. Thin plates have a low is bending stiffness compared to their membrane stiffness. This makes them particularly susceptible to buckling. In fact, the dominant mode of distortion induced by welding in these structures is buckling of the plate. Of the six modes of distortion, buckling distortion is the only one that is not linearly proportional to the stress pattern. In fact, buckling is an inherently unstable phenomenon and can therefore often be mitigated by changes in the stress pattern. In other words, as weld induced residual stress is applied to the plate a proportional amount of distortion is caused. As the residual stress increases, the distortion increases up to the instability point and then unstable buckling occurs.

Buckling is caused by compressive stresses in the plate. The compressive stress in the plate arises to counter the tensile stress induced at the weld. Generally, the areas of the plate that are subject to a heating process, either by welding or application of an auxiliary heat source, remain in tension (positive residual stress) when the plate cools to room temperature. Alternatively, areas of the plate that are adjacent to the heated areas, end up in compression (negative residual stress) when the plate cools to room temperature. Large expanses of the plate, between stiffeners, are typically in compression after welding. It is these unsupported areas between the stiffeners that induce the observed buckling. While disclosed primarily in the welding of stiffeners to plate, the transient thermal tensioning of the instant invention may be used in many other welding applications, such as, by way of example and not limitation, the butt welding of sheets.

An example of a single stiffener welded to a relatively thin plate is illustrated in FIG. 1. Taken in transverse section, a single stiffener 100 is shown welded in a longitudinal direction at approximately the center of the plate 200. The residual stress profile at various points along the transverse section is shown. Areas above the horizontal line, or zero stress point, represent areas that are in residual tensile stress. Areas below the horizontal line, or zero stress point, represent areas that are in residual compressive stress. It can be seen that there exists an area of maximal tensile stress at the weld lines of the stiffener 100, and that stress drops to compression slightly lateral to the stiffener 100, and remains in slightly decreasing compression to the edge of the plate 200. To maintain the plate 200 in equilibrium, the integral of the residual stress, taken over the width of the plate 200, must sum to zero.

Traditional efforts to reduce buckling center around reducing the tensile residual stress induced during the welding process. Such traditional techniques include pre-weld chilling, static thermal tensioning, and many others. All these processes have associated costs and need to be reconciled to the manufacturing set-up already in place.

The method of transient thermal tensioning of the present invention focuses on reducing a stiffened plate's propensity to distort when joining, by welding, at least one plate 200 and at least one stiffener 100. The method of transient thermal tensioning of the present invention consists generally of placing the at least one stiffener 100 on the at least one plate 200; locating at least one welding device 300 in close proximity to the at least one stiffener 100 and the at least one plate 200; determining at least one location 412 on the at least one plate 200 to apply at least one heat source 400, at a predetermined lateral distance 414 from the at least one stiffener 100 and at a predetermined separation distance 430 from a surface 210 of the at least one plate 200, to minimize the propensity of the at least one plate 200 to distort; applying the at least one heat source 400 to the at least one location on the at least one plate 200; energizing and moving the at least one welding device 300 to weld the at least one stiffener 100 to the at least one plate 200; and moving the at least one heat source 400 in conjunction with the travel of the at least one welding device 300. While the instant invention is illustrated herein as a single or paired welding device 300 operating with a single or paired heat source 400, the use of multiple welding devices 300 and multiple heat sources 400 is contemplated. In particular, the method may be used to weld multiple stiffeners 100 at the same time. Additionally, the method does not contemplate a particular order of welding stiffeners 100 to plates 200, that is, stiffeners 100may be welded beginning near one lateral edge of the plate 200 and then progressing in a predetermined pattern across the plate 200, or a central stiffener 100 may be welded near the center of the plate 200 and subsequent stiffeners 100 welded laterally to the central stiffener 100, or some other pattern of stiffener welding may be optimized to the individual demands of a particular situation.

Figure 2:
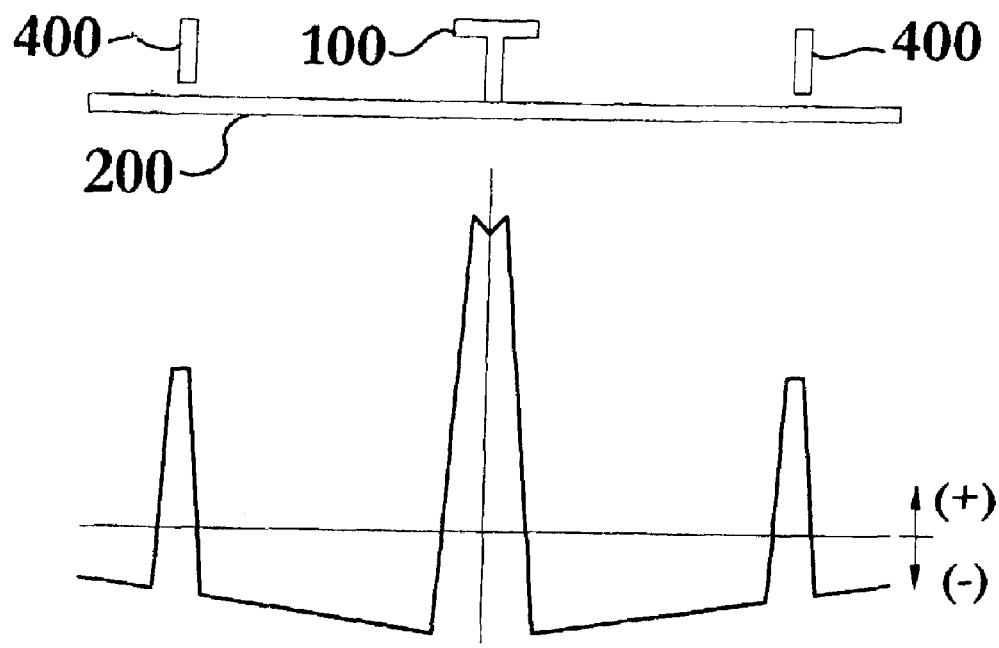
FIG. 2 shows, in transverse section, a residual stress profile of an experimental plate with a single welded longitudinal stiffener that has been welded utilizing the method of transient thermal tensioning of the instant invention.

The method of the present invention takes the approach of altering the residual stress in the at least one plate 200 rather than minimizing or eliminating it, as with prior art attempts at reducing distortion. For example, a single stiffener 100 welded to a single plate 200 with residual stress altered by transient thermal tensioning is illustrated in FIG. 2. Taken in transverse section, a single stiffener 100 is shown welded in a longitudinal direction at approximately the center of the plate 200. Transient thermal tensioning according to the method of the instant invention has been applied by heat sources 400, lateral to the single stiffener 100, as also seen in FIG. 2, during the welding process as described herein. Shown below the transverse section is the residual stress profile along the transverse section. Areas above the horizontal line, or zero stress point, represent areas that are in residual tensile stress. Areas below the horizontal line, or zero stress point, represent areas that are in residual compressive stress. It can be seen that there exists an area of maximal tensile stress at the weld lines of the stiffener 100, and that stress drops into compression moving lateral to the stiffener 100. Near the edge of the plate 200, the areas exposed to transient thermal tensioning exist in tensile stress. To maintain the plate 200 in equilibrium, the integral of the residual stress, taken over the width of the plate 200, must sum to zero.

Because the areas of transient thermal tensioning induced tensile stress tend to increase the strain energy required for out of plane bending, a buckling analysis of the plate of FIG. 2 has a higher eigenvalue than that of the plate of FIG. 1, and is less likely to buckle. If the calculation of eigenvalues produces any that are less than 1, the plate is predicted to buckle. Experimentally, the plate 200 as it is shown welded in FIG. 1, has a minimum cigenvalue of 0.58, and would therefore be expected to buckle. The plate 200 as it is shown in FIG. 2, welded with the application of transient thermal tensioning according to the instant invention, has a calculated minimum eigenvalue of 2.96, and therefore would not be expected to buckle. In fact, the relative propensity of the plates of FIGS. 1 and 2 to buckle maybe expressed as the quotient of their calculated minimum eigenvalues, that is, the plate as welded in FIG. 2, with the application of transient thermal tensioning according to the instant invention, has over five times the expected resistance to buckling of the plate of FIG. 1 (2.96/0.58=5.1034)

The step of determining the at least one location 412 on the at least one plate 200 to apply the at least one heat source 400 to minimize the propensity of the at least one plate 200 to distort may further include the minimization of the propensity of the at least one plate 200 to buckle. The propensity to buckle depends on a large number of factors. For rectangular unstiffened plates, the propensity to buckle may be calculated using closed-form equations dependent upon the plate 200 thickness, the ratio of the plate 200 width to the length, and the elastic modulus of the material. When stiffeners 100 are added to a plate 200, additional variables enter into the calculation, including the geometry of the stiffeners 100 and the spacing of the stiffeners 100. When stiffeners 100 are welded to a plate 200, closed-form solutions are inadequate to predict the propensity to buckle and numerical modeling is required.

Still further, the step of determining the at least one location 412 on the at least one plate 200 to apply the at least one heat source 400 to minimize the propensity of the at least one plate 200 to buckle may also further comprise the step of altering the residual stress in the at least one plate 200. By altering the residual stress in the at least one plate 200 the stress-stiffness of the structure is enhanced and the propensity to buckle is reduced. Because the out-of-plane distortion is not linearly proportional to the stress, small changes in stress result in dramatic reductions in the out-of-plane distortion. Altering the residual stress in the at least one plate 200 may be accomplished in a number of ways. In one particular embodiment, the step of altering the residual stress in the at least one plate 200 further comprises the step of disrupting at least one compressive stress pattern in the at least one plate 200 by inducing at least one area of tensile stress.

Figure 3:
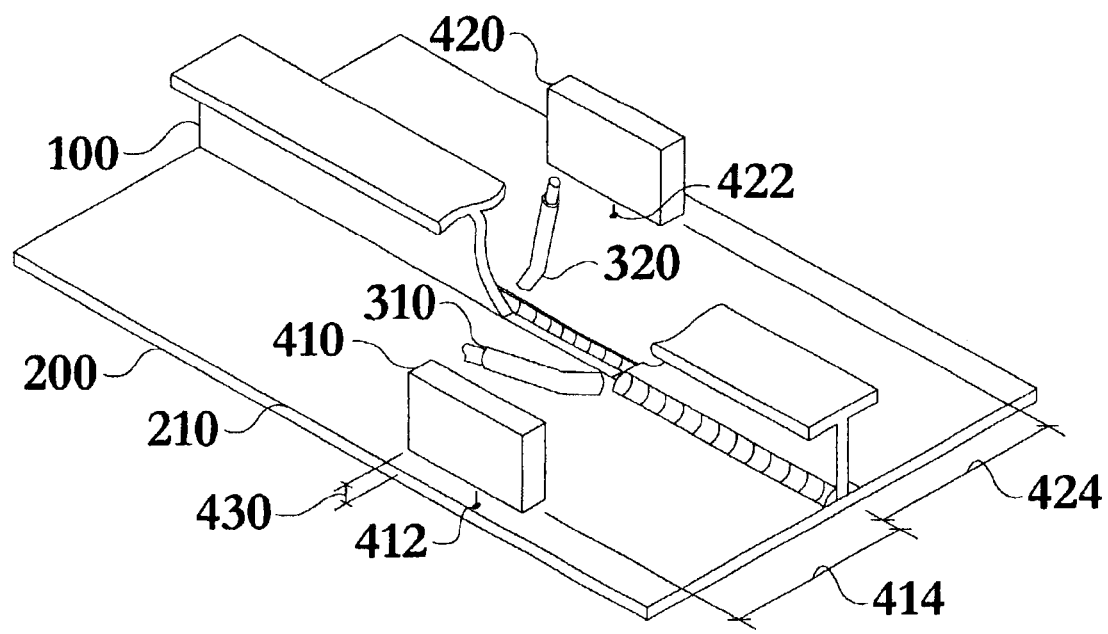
FIG. 3 shows an elevated perspective view, not to scale, of the plate, stiffener, welding means, and heat sources of one embodiment of the instant invention.

In an illustrative embodiment, shown in FIG. 3., of the present invention, two welding devices 310, 320, and two heat sources 410, 420; located on opposing sides of a stiffener 100, are used. A first welding device 310 and a second welding device 320, located on opposing sides of the stiffener 100, may concurrently weld the opposing sides of the stiffener 100 to the plate 200. A first heat source 410 may be located at a first predetermined lateral distance 414 from a stiffener 100 and a second heat source 420 may be located at a second predetermined lateral distance 424 from the stiffener 100, on the opposing side. The first 410 and second 420 heat sources act to introduce tensile residual stress thereby altering the normal compressive residual stress profile.

As one with skill in the art can appreciate, the at least one welding device 300 may be any fusion welding equipment. The at least one welding device 300 would most likely be an arc welding device in most widespread applications. Similarly, the at least one heat source may include virtually any means for transferring heat from an external source to the at least one plate 200. Such heating sources may be in contact with the at least one plate 200 or may be separated by a predetermined separation distance 414 from a surface 210 of the at least one plate. In one particular embodiment it has been found that flame heaters have provided a cost effective heating source of minimal complexity. Such a configuration requires minimal effort to implement into existing stiffener 100 and plate 200 welding arrangements, as might be common in a shipyard. In this embodiment, the flame heaters are held away from the at least one plate 200 by the predetermined separation distance 430 and they may be fueled by virtually any combustible, most commonly natural gas. The flame from the flame heaters may extend across the predetermined separation distance 430, thereby coming in contact with the at least one plate 200, or the flame may be held away from the surface 210 of the at least one plate 200. In additional embodiments, the heat source may be supplied by resistance heating, induction heating, heat pads, the direct application of electrical current to the plate, or by various other methods of heat application, as would be understood by one skilled in the art.

The at least one welding device 300 and the at least one heat source 400 may move concurrently during the welding process, thereby not requiring additional time to fabricate a stiffened panel. This may be achieved through mounting them on a common motion control system, or through the use of more advanced automated motion control systems. The at least one heat source may lead, follow, or align with the at least one welding device as welding occurs.

As one with skill in the art can appreciate, once it is recognized that transient thermal tensioning to minimize distortion should not focus on minimizing residual stress, but rather on minimizing the propensity to distort, a number of techniques may be used in determining optimal locations to apply the at least one heat source. One such method particularly well suited for this determination is finite element analysis (FEA) modeling. FEA is a technique for predicting the responses of structures and materials to environmental factors such as force, heat, and vibration. The process starts with the creation of a geometric model, which is then divided into smaller shapes connected at specific nodal points. In this manner, stress-strain relationships are more easily approximated. Finally, the material behavior and boundary conditions are applied to each element, and the analysis is performed.

Traditional FEA of distortion in stiffened panels have shown a good correlation with experimental results. As one with skill in the art can appreciate, distortion in a panel sets in only after the panel has cooled. The term panel herein refers to the combined manufacture of at least one stiffener 100 welded to at least one plate 200. During welding of the at least one stiffener 100 to the at least one plate 200, the geometry of the panel remains within small-deformation bounds. Thus, it has been recognized that the buckling analysis and residual stress analysis can be decoupled. Residual stresses can be determined on the unbuckled panel and then the stresses can be used as loading for a buckling analysis. Prior techniques then create a "welding load" in the form of a contraction at the weld line computed from the residual stress and apply this welding load to a 3D structural model of the panel for further analysis. Buckling analysis is then performed on the loaded model thereby yielding the propensity of the panel to buckle.

The methods to predict buckling include a series of steps that are performed in order, specifically: 1) a thermal model for calculation of temperature histories throughout the plate 200, 2) a method to predict the residual stress induced in the plate 200 by the welding process and any auxiliary heat application, and 3) an eigenvalue solver to determine the buckling modes. The thermal analysis is performed by using any suitable finite element analysis technique.

Upon the discovery that transient thermal tensioning to minimize distortion should not focus on minimizing residual stress, but rather on minimizing the propensity to distort, the present inventors recognized a preferred method of analysis. The preferred method of analysis is just one example of modeling transient thermal tensioning to minimize distortion based upon minimizing the propensity to buckle, and shall not be construed to be limiting on the scope of the present invention. It has been determined that the previously mentioned step of computing a welding load is unnecessary. Due to the possibility of utilizing several heating locations and patterns, computing the welding load is replaced by transferring residual stresses from the stress analysis directly to the buckling analysis. The optimum heater locations are then determined by modeling several cases and selecting one with the least propensity to buckle. This approach is applied to a laboratory mock-up panel and to a full sized shipyard panel, with the results explained below.

Residual Stress Prediction

The weld process is well approximated to be one way coupled thermo-elastoplastic. Transient heat-transfer analyses simulate the temperature history in the structure due to welding. The temperature history is used as loading for a quasi-static elastoplastic analysis. This approach has been shown to yield good estimations of residual stresses.

Due to the computational expense of full three-dimensional (3D) models, the weld process is often approximated in two dimensions (2D). Such a 2D model consists of a cross section of the welded structure normal to the welding direction. In a typical panel, the cross section of the panel is uniform in the welding direction. The welding parameters like heat input, etc. are also kept constant. Any number of finite element analysis techniques may then be used to compute the residual stress.

Figure 4:
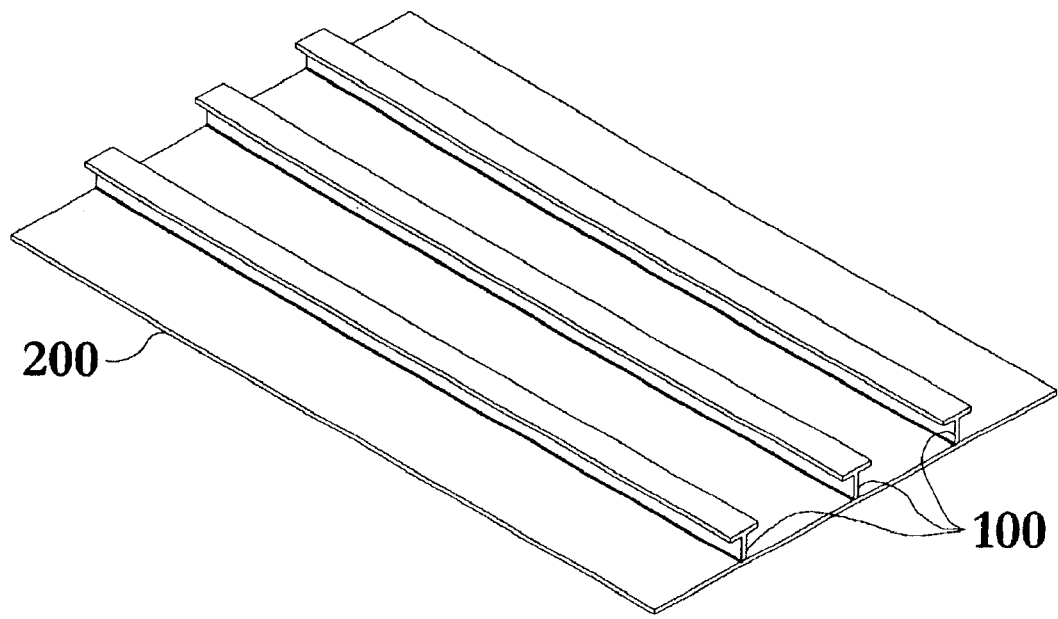
FIG. 4 shows an elevated perspective view, not to scale, of a plate having three longitudinal stiffeners welded approximately equidistantly along the long axis of the plate.

The experimental panel consists of a plate 200 of size 8×20 feet, and is $3/16^{th}$ inch thick. Three tee-shaped stiffeners 100, each 4×4 inches are fillet welded to the plate 200 along the 20 foot direction, similar to the configuration illustrated in FIG. 4. The stiffeners 100 are placed 2 feet apart from the edges and each other. The fillet welds are $3/16$ inch leg size and are continuous. The experimental weld process is flux cored arc welding. Welding on both sides of the stiffener 100 is carried out simultaneously with an electrode offset of 4 inches. Both the plate 200 and the stiffeners 100 are made of AH36 steel. Standard thermal and mechanical material properties are used for the analysis.

The panel is modeled using 20-noded brick elements. The analysis of the experimental panel is carried out in three passes. Each pass involves the welding of a single stiffener 100 and application of the two heat sources 410, 420. The results at the outlet of the model are used as inlet conditions for the subsequent pass. The analysis is one way coupled. Three thermal solutions representing each pass are used to load the three subsequent elastoplastic simulations.

In the experiment, the heat input of each weld was 15 KJ/inch. It is applied in a Gaussian distribution over a double ellipsoid volume. The heat sources were flame heaters having a length of 6 inches and they were aligned with the electrode. The heat input at each heater is 11.2 KJ/inch. The heat input for the flame heater is applied in a Gaussian distribution on a rectangular area. The travel speed is 23 inch/minute. In different embodiments, the heat input of the weld and of the heat sources may be variable, and in particular, those embodiments using a plurality of heat sources may operate with various heat sources operating at variable heat input.

Buckling Analysis

The residual stresses at the outlet of the $3^{rd}$ pass of eulerian analysis are applied along the entire length of the buckling model. The stresses are ramped to zero at the start and end edges to simulate free stress conditions. The stress stiffness matrix $k_o$ is assembled directly from the stresses as follows.

$$k_\sigma = \sum_{element} \sum_{volume}^{gausspts} G^T \begin{bmatrix} s & 0 & 0 \\ 0 & s & 0 \\ 0 & 0 & s \end{bmatrix} GWJ \text{ and}$$

Where the stress matrix s given by $$s = \begin{bmatrix} \sigma_{0x} & \tau_{0xy} & \tau_{0zx} \\ \tau_{0xy} & \sigma_{0y} & \tau_{0yz} \\ \tau_{0zx} & \tau_{0yz} & \sigma_{0z} \end{bmatrix}$$

Matrix G operates on the nodal displacements u so that $$Gu=[u_{,x}\ u_{,y}\ u_{,z}\ v_{,x}\ v_{,y}\ v_{,z}\ w_{,x}\ w_{,y}\ w_{,z}]^T$$

The eigenvalue problem solved to obtain the mode shapes and associated eigenvalues is $$ke=-\lambda k_{\sigma e}$$

where k is the elastic stiffness, e are the eigenvectors and $\lambda$ are the eigenvalues. The lowest eigenvalue indicates the fraction of applied load sufficient to make the structure buckle. Thus low eigenvalues indicate high buckling propensity. Eigenvalues above unity indicate that buckling will not occur.

Boundary conditions are difficult to prescribe for the buckling analysis. This is because the supporting conditions for the structure depend on the buckled shape, which is not known a priori. Thus, the panel is constrained by forcing all the stiffener lines to lie in the same horizontal plane. Upon examination of the experimental buckled panels, this assumption was found to be valid.

Correlation with Experiments

Experimental panels were fabricated in the laboratory with varying tensioning dimensions. Table 1 shows thermal tensioning parameters for seven panels fabricated in the laboratory. The tensioning dimensions, indicated by TD1 and TD2 in the table, indicate the distance in inches of the auxiliary heater from the stiffener line, and are analogous to the previously discussed predetermined lateral distances 414, 424. Values of zero indicate no auxiliary heating used at the location, e.g., Experiment 1 reflects a control experiment where no thermal tensioning was used.

For example, Experiment 1, an untensioned plate with three welded stiffeners, showed a low eigenvalue (0.21455) which correlated with a large degree of out-of-plane distortion in the welded panel, as seen in FIGS. 9, 11, 13, and 15. Contrariwise, Experiment 7, a thermally tensioned plate wherein the thermal tensioning was applied at the tensioning dimensions as seen in Table 1, showed a much higher eigenvalue, which correlated with less out-of-plane distortion, as seen in FIGS. 8, 10, 12, and 14.

TABLE 1

| | Thermal Tensioning Cases | | | | | | |
|---|---|---|---|---|---|---|---|
| | Pass 1 | | Pass 2 | | Pass 3 | | |
| Experiment | TD1 | TD2 | TD1 | TD2 | TD1 | TD2 | Eigenvalue |
| 1 | 0 | 0 | 0 | 0 | 0 | 0 | 0.21455 |
| 2 | 10 | 10 | 10 | 10 | 10 | 10 | 0.14721 |
| 3 | 20 | 20 | 20 | 20 | 20 | 20 | 0.42858 |
| 4 | 20 | 20 | 10 | 10 | 10 | 20 | 0.42277 |
| 5 | 20 | 20 | 10 | 20 | 10 | 20 | 0.40588 |
| 6 | 20 | 0 | 0 | 0 | 0 | 20 | 0.8801 |
| 7 | 21 | 0 | 44 | 44 | 0 | 21 | 0.8882 |

The experimental buckling mode shapes and eigenvalues compared well with predicted mode shapes. Further, the magnitude of the displacements compares well with the eigenvalues, as can be seen in comparing the eigenvalue in the experimental plate made without transient thermal tensioning, that is, comparing Experiment 1 of Table 1 with the out-of-plane distortions seen in FIGS. 9, 11, 13 and 15. Similarly, comparing the eigenvalue in the plate made with optimal transient thermal tensioning, that is, Experiment 7 of Table 1, shows a reduced level of out-of-plane distortion seen in FIGS. 8, 10, 12, and 14. In general, the larger the eigenvalue, the less the out-of-plane distortion, with eigenvalues greater than unity indicating no propensity to buckle.

Minimizing Buckling Distortion

The experimental correlation indicates that a given auxiliary heat pattern can be evaluated adequately. In absence of a rigorous formulation for the sensitivity of the eigenvalues to the auxiliary heat pattern, the approach taken was to exhaust the design space, and choose the best auxiliary heat pattern. Due to the large number of trials, residual stress analyses were not conducted for each trial. The residual stress due to a single auxiliary heater and a single weld pass were merged to obtain the appropriate overall stress profile. The auxiliary heaters were far enough from the weld line for the superimposition to be valid. However, residual stresses due to adjacent heaters have a small error due to merging.

Due to the stiffeners on the plate, the buckling modes involve out-of-plane edge waviness and waviness between stiffeners. The stress-stiffness of these areas may be increased by introducing residual tensions in these areas, in this particular case. Similarly, in this particular experiment, it was found that applying auxiliary heat between the stiffeners reduces the eigenvalues. Thus, only the effect of heaters on the edges was investigated.

Transient Thermal Tensioning in an Experimental Plate with Three Stiffeners

Figure 5:
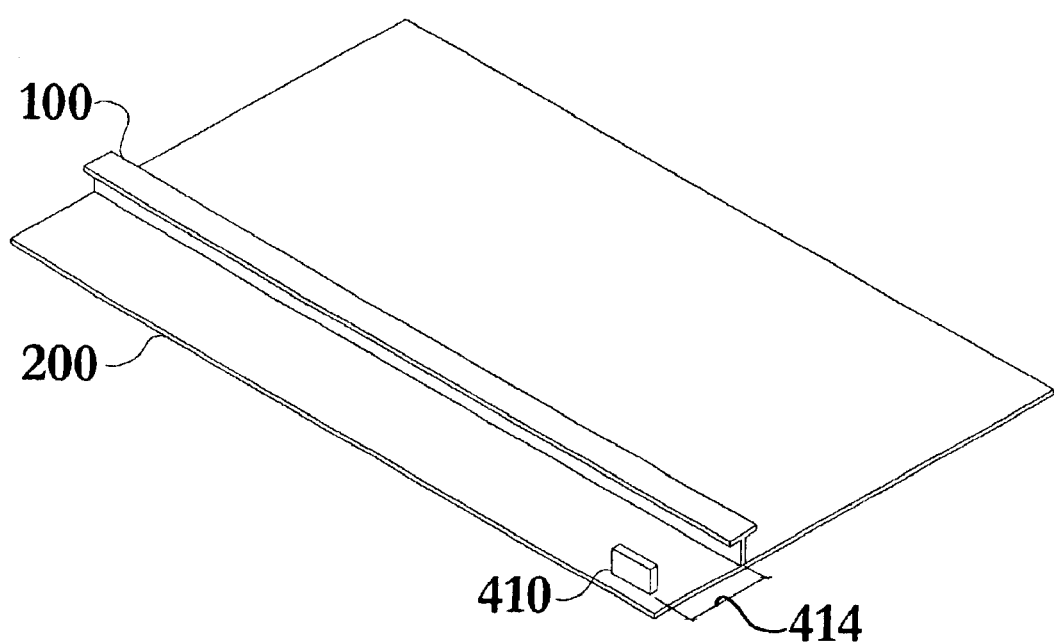
FIG. 5 shows an elevated perspective view, not to scale, showing an 8 foot by 20 foot experimental plate with a first stiffener placed approximately two feet from one edge of the plate, in welding position, with one heat source placed approximately twenty-one inches from the centerline of the stiffener.
Figure 16:
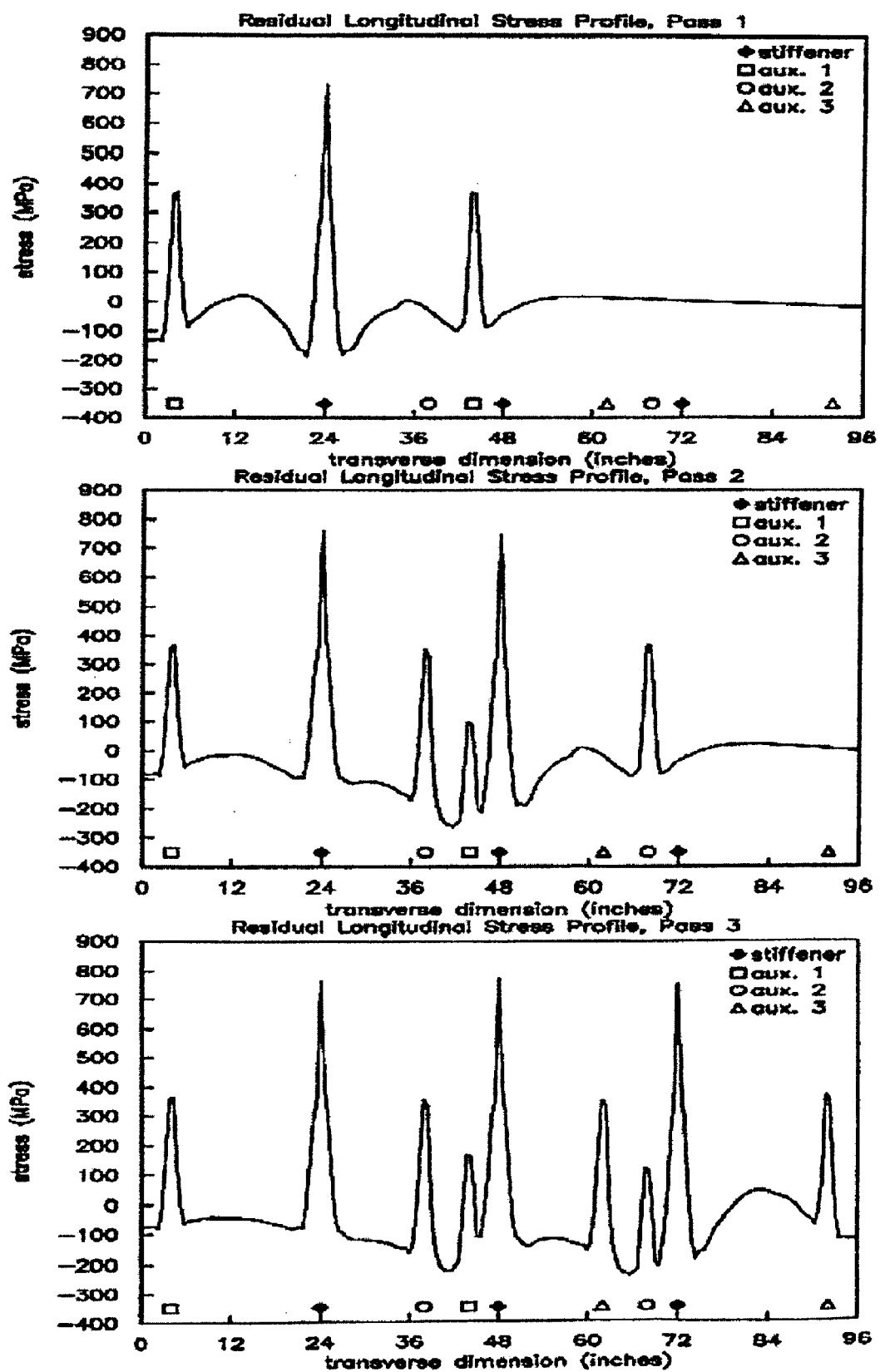
FIG. 16 shows a graph of the residual longitudinal stress profile, measured in transverse section, of an 8 foot by 20 foot experimental plate after a first, (top; labeled Pass One), (middle, labeled Pass Two), and third (bottom; labeled Pass Three, longitudinal stiffener or stiffeners has been welded, as illustrated in FIG. 5, according to the method of the instant invention utilizing transient thermal tensioning.

The longitudinal stress profile for a representative example of an experimental plate 200 welded with three longitudinal stiffeners 100 appears in FIG. 16. The top graph of FIG. 16, indicated as Pass One, shows the longitudinal stress profile of the experimental plate 200 after the welding of a single stiffener 100, as shown in FIG. 5, according to the transient thermal tensioning method of the instant invention. The single stiffener 100 has been welded longitudinally at approximately 24 inches from a first edge of the plate 200, and the welding of the single stiffener 100 has created an area of residual tensile stress of that rises to a level of approximately 750 MPa. Just lateral to the weld lines, on both sides of the single stiffener 100, are areas of residual compressive stress falling to levels of approximately −200 MPa. Transient thermal tensioning according to the method of the instant invention, applied approximately 20 inches lateral to the single stiffener 100, have induced additional areas of residual tensile stress, rising to levels of approximately 375 MPa.

Figure 6:
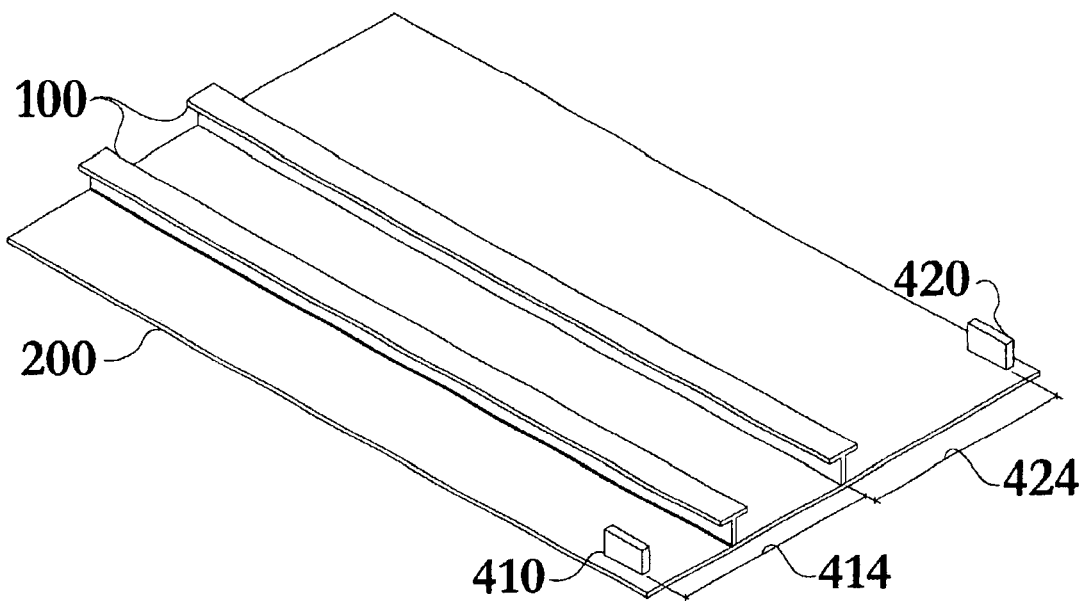
FIG. 6 shows an elevated perspective view, not to scale, showing an 8 foot by 20 foot experimental plate with a first stiffener welded to the plate, a second stiffener in welding position, and two heat sources, each heat source placed approximately forty-four inches from the centerline of the second stiffener.

The middle graph of FIG. 16, indicated as Pass Two, shows the longitudinal stress profile of the experimental plate 200 after the welding of a second stiffener 100, as shown in FIG. 6, according to the transient thermal tensioning method of the instant invention. The second stiffener 100 has been welded longitudinally at approximately 48 inches from the first edge of the plate 200, and the welding of the single stiffener 100 has created an area of residual tensile stress of that rises to a level of approximately 750 MPa. Just lateral to the weld lines, on both sides of the second stiffener 100, are areas of residual compressive stress falling to levels of between approximately −150 and −200 MPa. Transient thermal tensioning according to the method of the instant invention, applied approximately 38 and 70 inches from the first edge of the plate 200, and therefore lateral to the second stiffener 100, have induced additional areas of residual tensile stress, rising to levels of approximately 375 MPa.

Figure 7:
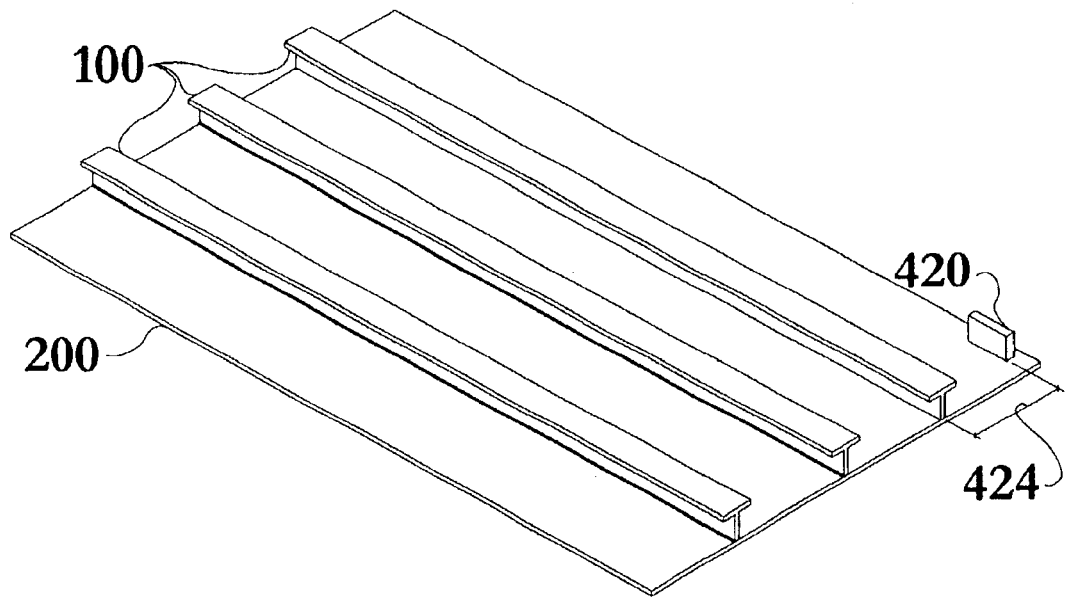
FIG. 7 shows an elevated perspective view, not to scale, showing an 8 foot by 20 foot experimental plate with a first and second stiffener welded to the plate, a third stiffener in welding position, and one heat source placed approximately twenty-one inches from the centerline of the third stiffener.
Figure 8:
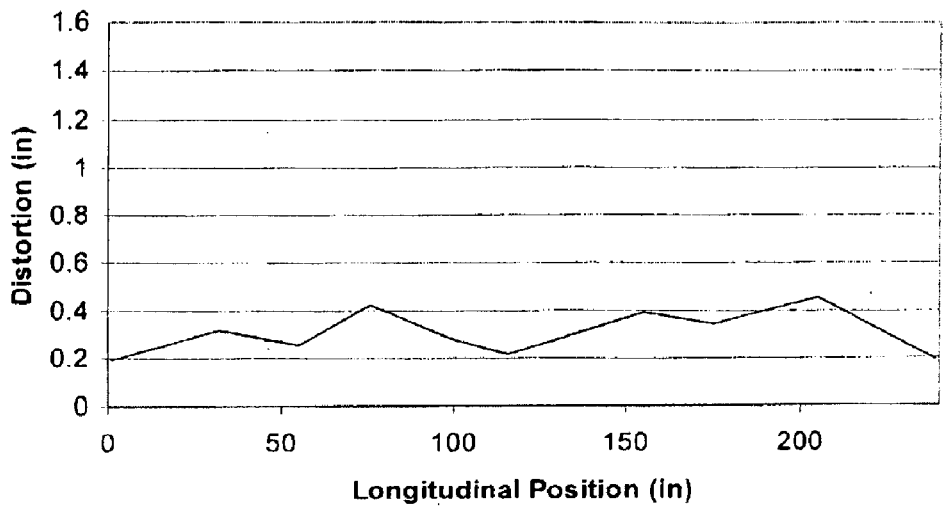
FIG. 8 shows a graph of the measured amount of out-of-plane distortion (vertical axis) measured at ½ inch from a plate edge, along the longitudinal length (horizontal axis), of an 8 foot by 20 foot experimental plate reinforced with three welded longitudinal stiffeners, having been welded according to the method of the instant invention utilizing transient thermal tensioning.
Figure 9:
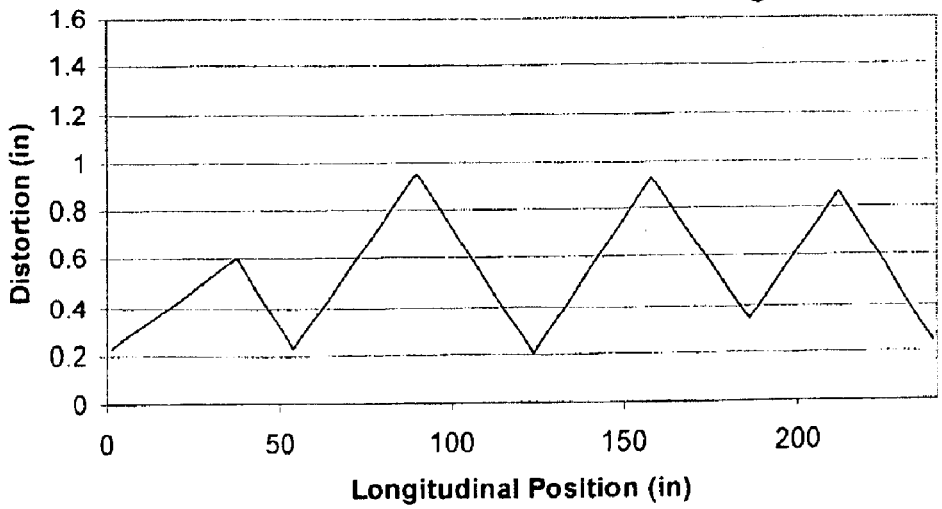
FIG. 9 shows a graph of the measured amount of out-of-plane distortion (vertical axis) measured at ½ inch from a plate edge, along the longitudinal length (horizontal axis), of an 8 foot by 20 foot experimental plate reinforced with three welded longitudinal stiffeners, having been welded without utilizing transient thermal tensioning.
Figure 10:
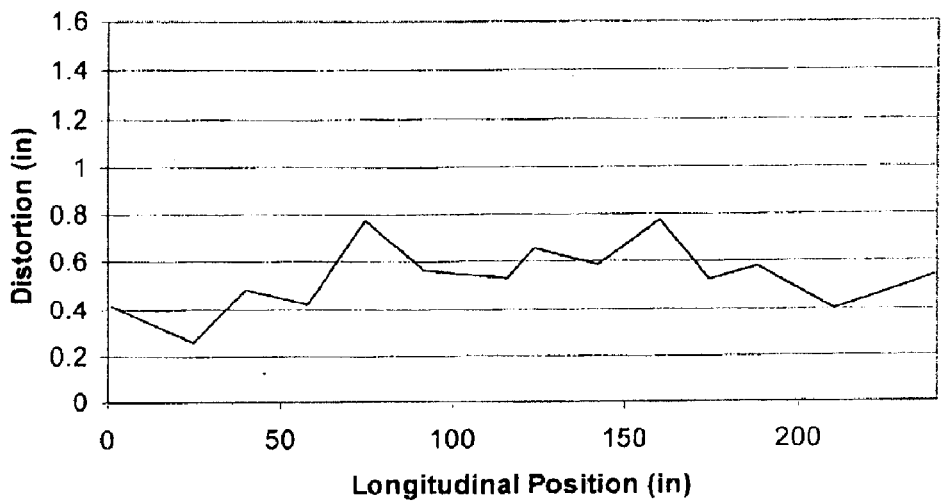
FIG. 10 shows a graph of the measured amount of out-of-plane distortion (vertical axis) measured at 36½ inches from a plate edge, along the longitudinal length (horizontal axis), of an 8 foot by 20 foot experimental plate reinforced with three welded longitudinal stiffeners, having to been welded according to the method of the instant invention utilizing transient thermal tensioning.
Figure 11:
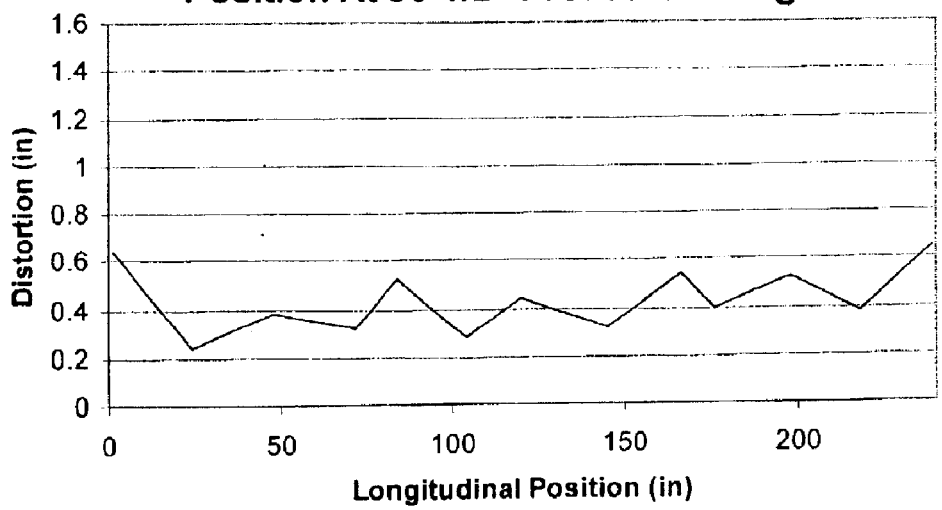
FIG. 11 shows a graph of the measured amount of out-of-plane distortion (vertical axis) measured at 36½ inches from a plate edge, along the longitudinal length (horizontal axis), of an 8 foot by 20 foot experimental plate reinforced with three welded longitudinal stiffeners, having been welded without utilizing transient thermal tensioning.
Figure 12:
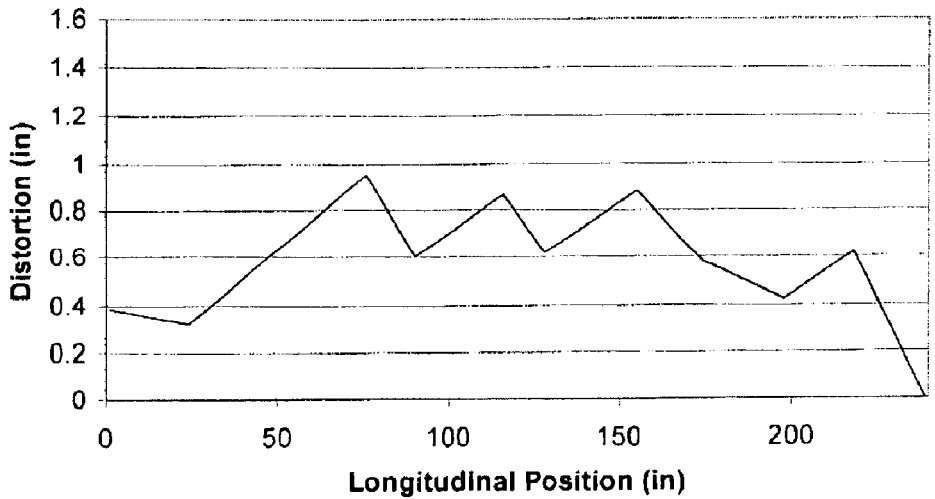
FIG. 12 shows a graph of the measured amount of out-of-plane distortion (vertical axis) measured at 60½ inches from a plate edge, along the longitudinal length (horizontal axis), of an 8 foot by 20 foot experimental plate reinforced with three welded longitudinal stiffeners, having been welded according to the method of the instant invention utilizing transient thermal tensioning.
Figure 13:
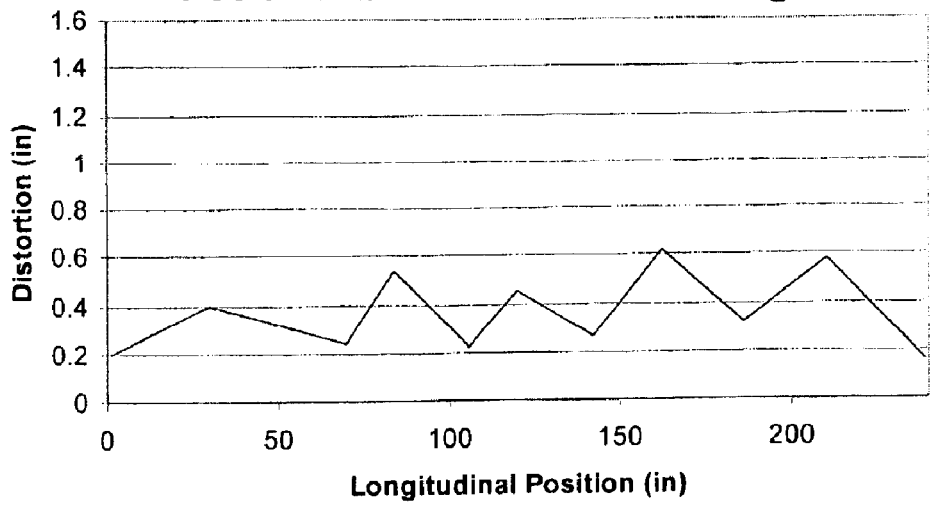
FIG. 13 shows a graph of the measured amount of out-of-plane distortion (vertical axis) measured at 60½ inches from a plate edge, along the longitudinal length (horizontal axis), of an 8 foot by 20 foot experimental plate reinforced with three welded longitudinal stiffeners, having been without utilizing transient thermal tensioning.
Figure 14:
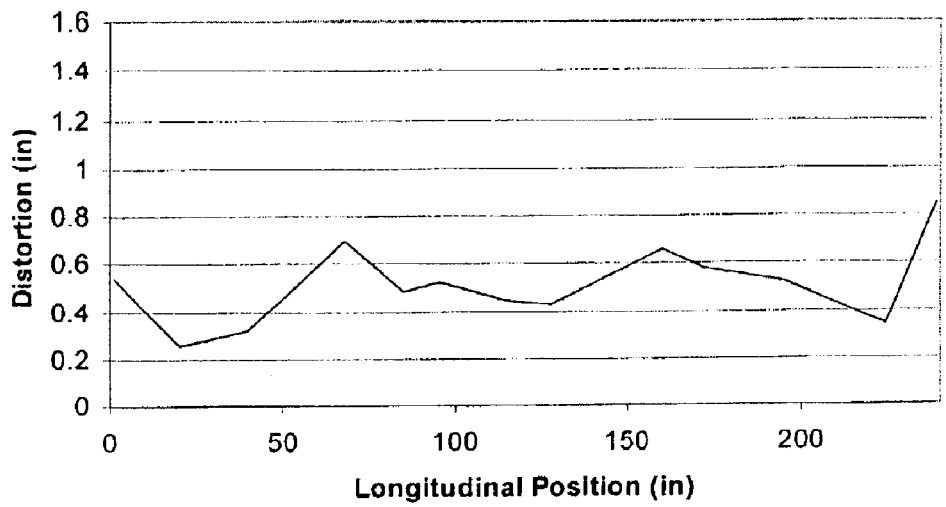
FIG. 14 shows a graph of the measured amount of out-of-plane distortion (vertical axis) measured at 95½ inch from a plate edge, along the longitudinal length (horizontal axis), of an 8 foot by 20 foot experimental plate reinforced with three welded longitudinal stiffeners, having been welded according to the method of the instant invention utilizing transient thermal tensioning.
Figure 15:
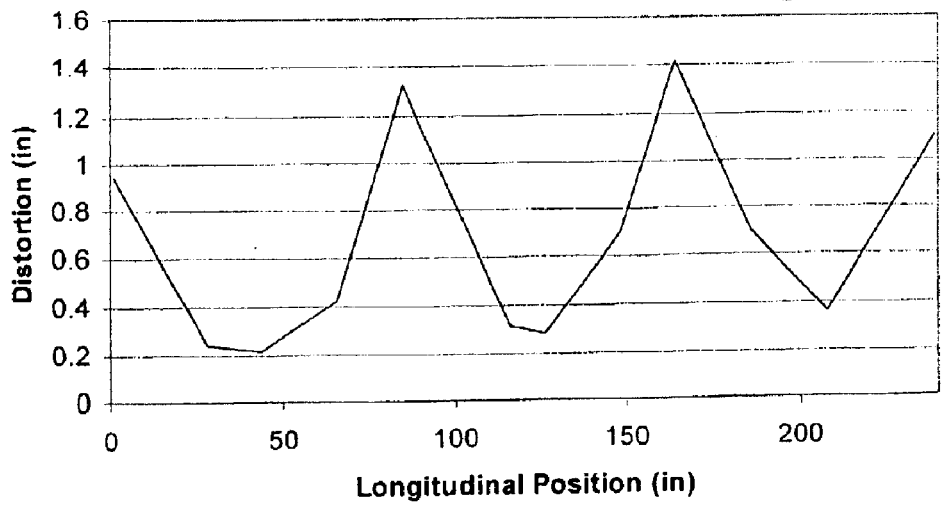
FIG. 15 shows a graph of the measured amount of out-of-plane distortion (vertical axis) measured at 95½ inch from a plate edge, along the longitudinal length (horizontal axis), of an 8 foot by 20 foot experimental plate reinforced with three welded longitudinal stiffeners, having been welded without utilizing transient thermal tensioning.

The bottom graph of FIG. 16, indicated as Pass Three, shows the longitudinal stress profile of the experimental plate 200 after the welding of a third stiffener 100, as shown in FIG. 7, according to the transient thermal tensioning method of the instant invention. The third stiffener 100 has been welded longitudinally at approximately 72 inches from the first edge of the plate, and the welding of the single stiffener 100 has created an area of residual tensile stress of that rises to a level of approximately 750 MPa. Just lateral to the weld lines, on both sides of the second stiffener 100, are areas of residual compressive stress falling to levels of between approximately −150 and −200 MPa. Transient thermal tensioning according to the method of the instant invention, applied approximately 62 and 92 inches from the first edge of the plate, and therefore lateral to the third stiffener 100, have induced additional areas of residual tensile stress, rising to levels of approximately 375 MPa Experimental Conclusions Experimentation confirmed that the method of transient thermal tensioning of the present invention greatly minimizes distortion in welded stiffened plates 200. Further, finite element modeling of the process has been demonstrated and used to determine the optimum locations of the at least one heat source 400 to minimize distortion. Therefore, the method of the present invention successfully reduces the propensity of a stiffened plate 200 to buckle by disrupting the large expanses of compression that exist between stiffeners 100, without making any attempt to reduce the peak stress that is the focus of prior distortion reducing attempts.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute, and/or additional or alternative materials, relative arrangement of elements, and dimensional configurations. Accordingly, even though only a few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

We claim:

1. A method of transient thermal tensioning at least one plate during joining of at least one stiffener to the at least one plate resulting in a stiffened plate, by welding to minimize distortion, comprising the steps of:

determining at least one location on the at least one plate to apply at least one heat source, at a predetermined lateral distance from the at least one stiffener and at a predetermined separation distance from a surface of the at least one plate, to minimize the propensity of the at least one plate to distort by minimizing the propensity of the at least one plate to buckle by altering the residual stress pattern in the at least one plate;

placing the at least one stiffener on the at least one plate;

locating at least one welding device in close proximity to the at least one stiffener and the at least one plate;

applying the at least one heat source to the at least one location on the at least one plate;

energizing and moving the at least one welding device to weld the at least one stiffener to the at least one plate; and moving the at least one heat source in conjunction with the travel of the at least one welding device.

2. The method of claim 1, wherein the step of determining the at least one location on the at least one plate to apply the at least one heat source to minimize the propensity of the at least one plate to distort further includes minimization of the propensity of the at least one plate to buckle.

3. The method of claim 2, wherein the step of determining the at least one location on the at least one plate to apply the at least one heat source to minimize the propensity of the at least one plate to buckle further comprises the step of altering the residual stress pattern in the at least one plate.

4. The method of claim 3, wherein the step of altering the residual stress pattern in the at least one plate produces a location of the at least one heat source resulting in a minimum buckling analysis eigenvalue of the stiffened plate of at least 0.4.

5. The method of claim 1, wherein the step of altering the residual stress pattern in the at least one plate further comprises the step of disrupting at least one compressive stress pattern in the at least one plate by inducing at least one area of tensile stress.

6. The method of claim 1, wherein the step of determining the at least one location on the at least one plate to apply the at least one heat source to minimize the propensity of the at least one plate to distort further includes locating a first location about a first side of one of the at least one stiffener, at a first predetermined lateral distance from the at least one stiffener, and a second location about a second side of one of the at least one stiffener, opposing the first side, at a second predetermined lateral distance from the at least one stiffener.

7. The method of claim 1, wherein the at least one welding device is a first welding device and a second welding device wherein the first welding device and the second welding device concurrently weld opposing sides of the at least one stiffener to the at least one plate.

8. The method of claim 1, wherein the at least one welding device is at least one arc.

9. The method of claim 1, wherein the at least one heat source is a flame heater.

10. The method of claim 1, wherein the at least one heat source further includes a plurality of heat sources being located at different predetermined lateral distances from the at least one stiffener.

11. The method of claim 1, wherein the at least one heat source further includes a plurality of heat sources of variable heating intensity.

12. A method of transient thermal tensioning at least one plate during joining of at least one stiffener to the at least one plate resulting in a stiffened plate, by welding to minimize distortion, comprising the steps of:

determining at least one location on the at least one plate to apply at least one heat source, at a predetermined lateral distance from the at least one stiffener and at a predetermined separation distance from a surface of the at least one plate, to minimize the propensity of the at least one plate to buckle by altering the residual stress pattern in the at least one plate by disrupting at least one compressive stress pattern in the at least one plate by inducing at least one area of tensile stress;

placing the at least one stiffener on the at least one plate;

locating at least one welding device in close proximity to the at least one stiffener and the at least one plate;

applying the at least one heat source to the at least one location on the at least one plate;

energizing and moving the at least one welding device to weld the at least one stiffener to the at least one plate; and moving the at least one heat source in conjunction with the travel of the at least one welding device.

13. The method of claim 12, wherein the step of altering the residual stress pattern in the at least one plate further comprises the step of disrupting at least one compressive stress pattern in the at least one plate by inducing at least one area of tensile stress.

14. The method of claim 12, wherein the step of determining the at least one location on the at least one plate to apply the at least one heat source to minimize the propensity of the at least one plate to buckle further includes locating a first location about a first side of one of the at least one stiffener, at a first predetermined lateral distance from the at least one stiffener, and a second location about a second side of one of the at least one stiffener, opposing the first side, at a second predetermined lateral distance from the at least one stiffener.

15. The method of claim 12, wherein the at least one welding device is a first welding device and a second welding device wherein the first welding device and the second welding device concurrently weld opposing sides of the at least one stiffener to the at least one plate.

16. The method of claim 12, wherein the at least one welding device is at least one arc.

17. The method of claim 12, wherein the at least one heat source is a flame heater.

18. The method of claim 12, wherein the step of altering the residual stress pattern in the at least one plate produces a location of the at least one heat source resulting in a minimum buckling analysis eigenvalue of the stiffened plate of at least 0.4.

19. The method of claim 12, wherein the at least one heat source further includes a plurality of heat sources being located at different predetermined lateral distances from the at least one stiffener.

20. The method of claim 12, wherein the at least one heat source further includes a plurality of heat sources of variable heating intensity.

21. A method of transient thermal tensioning at least one plate during joining of at least one stiffener to the at least one plate resulting in a stiffened plate, by welding to minimize distortion, comprising the steps of:

determining by numerical modeling of the stiffened plate and the process used to create the stiffened plate, at least one location on the at least one plate to apply at least one heat source, at a predetermined lateral distance from the at least one stiffener and at a predetermined separation distance from a surface of the at least one plate, to minimize the propensity of the at least one plate to buckle by altering the residual stress pattern in the at least one stiffened plate resulting in a minimum buckling analysis eigenvalue of the stiffened plate of at least 0.4;

placing the at least one stiffener on the at least one plate;

locating at least one welding device in close proximity to the at least one stiffener and the at least one plate;

applying the at least one heat source to the at least one location on the at least one plate;

energizing and moving the at least one welding device to weld the at least one stiffener to the at least one plate; and moving the at least one heat source in conjunction with the travel of the at least one welding device.

22. The method of claim 21, wherein the at least one heat source further includes source a plurality of heat sources of variable heating intensity being located at different predetermined lateral distances from the at least one stiffener.

\* \* \* \* \*